United States Patent
Park

(10) Patent No.: US 10,957,166 B2
(45) Date of Patent: Mar. 23, 2021

(54) SYSTEM AND METHOD FOR PROVIDING AUTOMATED TELLER SERVICE USING MOBILE TERMINAL

(71) Applicant: HAREX INFOTECH INC., Seoul (KR)

(72) Inventor: Kyung Yang Park, Seoul (KR)

(73) Assignee: HAREX INFOTECH INC., Seoul (KR)

( * ) Notice: Subject to any disclaimer, the term of this patent is extended or adjusted under 35 U.S.C. 154(b) by 55 days.

(21) Appl. No.: 15/762,928

(22) PCT Filed: Sep. 23, 2016

(86) PCT No.: PCT/KR2016/010675
§ 371 (c)(1),
(2) Date: Mar. 23, 2018

(87) PCT Pub. No.: WO2017/052275
PCT Pub. Date: Mar. 30, 2017

(65) Prior Publication Data
US 2018/0300991 A1    Oct. 18, 2018

(30) Foreign Application Priority Data
Sep. 23, 2015   (KR) ........................ 10-2015-0134516

(51) Int. Cl.
G06K 19/00       (2006.01)
G07F 19/00       (2006.01)
(Continued)

(52) U.S. Cl.
CPC ........... *G07F 19/203* (2013.01); *G06K 19/07* (2013.01); *G06Q 20/3221* (2013.01);
(Continued)

(58) Field of Classification Search
CPC ....... G07F 19/203; G07F 7/1041; H04L 9/32; H04L 9/3231; G06K 19/07;
(Continued)

(56) References Cited

U.S. PATENT DOCUMENTS

| | | |
|---|---|---|
| 8,632,000 B2 | 1/2014 | Laracey |
| 2011/0016047 A1 | 1/2011 | Wu et al. |

(Continued)

FOREIGN PATENT DOCUMENTS

| | | |
|---|---|---|
| KR | 2002-0070165 A | 9/2002 |
| KR | 10-2010-0040587 A | 4/2010 |

(Continued)

OTHER PUBLICATIONS

International Search Report for PCT/KR2016/010675 dated Dec. 29, 2016 [PCT/ISA/210].

(Continued)

*Primary Examiner* — Matthew Mikels
(74) *Attorney, Agent, or Firm* — Sughrue Mion, PLLC

(57) ABSTRACT

To achieve the above-mentioned objective, an automated teller machine service system according to one aspect of the present disclosure includes an automated teller machine (ATM) including a near-field communication (NFC) tag, a mobile terminal including a NFC chip and an input/output device for processing a deposit or withdrawal, and a server configured to receive transaction information for processing the deposit or withdrawal from the mobile terminal and, in a case in which the transaction information is identical to previously-saved information as a result of comparing the two pieces of information, transmit deposit/withdrawal authorization information to the ATM, wherein, when the NFC chip is brought into contact with the NFC tag, the ATM transmits a deposit/withdrawal application running command to the mobile terminal, and the mobile terminal (Continued)

receives the command and then runs the application to transmit the transaction information to the ATM or the server.

19 Claims, 8 Drawing Sheets

(51) Int. Cl.
*H04L 9/32* (2006.01)
*G06K 19/07* (2006.01)
*G07F 7/10* (2006.01)
*G06Q 20/40* (2012.01)
*G06Q 20/32* (2012.01)

(52) U.S. Cl.
CPC ..... *G06Q 20/3224* (2013.01); *G06Q 20/3278* (2013.01); *G06Q 20/4014* (2013.01); *G06Q 20/40145* (2013.01); *G07F 7/1041* (2013.01); *H04L 9/32* (2013.01); *H04L 9/3231* (2013.01)

(58) Field of Classification Search
CPC ......... G06Q 20/4014; G06Q 20/40145; G06Q 20/3221; G06Q 20/3224; G06Q 20/3278
See application file for complete search history.

(56) References Cited

U.S. PATENT DOCUMENTS

| 2012/0160912 | A1 | 6/2012 | Laracey |
| 2012/0197797 | A1* | 8/2012 | Grigg ................. G06Q 20/1085 705/43 |
| 2012/0265679 | A1 | 10/2012 | Calman et al. |
| 2013/0238497 | A1* | 9/2013 | Ramachandran ...... G06Q 20/18 705/41 |
| 2014/0263618 | A1 | 9/2014 | McCarthy et al. |
| 2016/0027006 | A1* | 1/2016 | Billett, Jr. .......... G06Q 20/3278 705/71 |

FOREIGN PATENT DOCUMENTS

| KR | 10-2013-0083815 A | 7/2013 |
| KR | 10-2014-0030619 A | 3/2014 |
| KR | 10-1514706 B1 | 4/2015 |
| KR | 10-1550825 B1 | 9/2015 |
| WO | 03/098525 A1 | 11/2003 |
| WO | 2014/177018 A1 | 11/2014 |

OTHER PUBLICATIONS

Communication dated Feb. 27, 2019 from European Patent Office in counterpart EP Application No. 16849000.1.

* cited by examiner

SYSTEM AND METHOD FOR PROVIDING AUTOMATED TELLER SERVICE USING MOBILE TERMINAL

TECHNICAL FIELD

The present disclosure relates to an automated teller machine service using a mobile terminal, and more particularly, to an automated teller machine service system and method thereof in which authentication is certified using a near-field communication (NFC) method between a user's mobile terminal and an automated teller machine (ATM).

BACKGROUND ART

A conventional automated teller machine (ATM) is configured of a processing device formed of a computer or the like configured to process a task related to a deposit or withdrawal, a display device configured to output information related to a deposit or withdrawal, and an input device through which information such as an account number or a password may be input. In a case in which a general touch panel display is used as the display device, it is common for the display device to also serve as an input device.

Various slots such as a card slot, a bankbook slot, and a cash slot are present at a front surface portion of the ATM. In a case in which cash is withdrawn using such an ATM, a bankbook or a cash card is inserted into a slot of the ATM, and whether to perform a deposit or withdrawal, a transaction amount, and a password are input through the input device of the ATM for the processing device to check the input pieces of information through communication with a server, and then to dispense cash through the cash slot. In this way, cash withdrawal is proceeded.

Since the display device and the input device are exposed to the outside of the ATM in the above process, content input to the ATM may be easily identified by surrounding people, and a card used during a deposit or withdrawal may also be recognized. Therefore, in a case in which a cash card or a bankbook is stolen, cash may be easily withdrawn with input of a password obtained as listed above, and loss due to theft is prone to occur.

Further, since a bankbook or a cash card has to be carried at all times for a deposit or withdrawal, there are many problems including an inconvenience of not being able to use an ATM in a case in which one does not have a bankbook or a cash card at hand.

DISCLOSURE

Technical Problem

The present disclosure has been devised from the above-described technical background, and it is an objective of the present disclosure to provide a withdrawal service system and a method thereof for allowing a user to use an automated teller machine (ATM) using a near-field communication (NFC) function of a mobile phone that the user carries at all times instead of using a cash card or a bankbook.

Objectives of the present disclosure are not limited to the above-mentioned objective, and other unmentioned objectives of the present disclosure will be apparent to those skilled in the art from the following descriptions.

Technical Solution

To achieve the above-mentioned objective, an automated teller machine service system according to one aspect of the present disclosure includes an automated teller machine (ATM) including a near-field communication (NFC) tag, a mobile terminal including a NFC chip and an input/output device for processing a deposit or withdrawal, and a server configured to receive transaction information for processing the deposit or withdrawal from the mobile terminal and, in a case in which the transaction information is identical to previously-saved information as a result of comparing the two pieces of information, transmit deposit/withdrawal authorization information to the ATM, wherein, when the NFC chip is brought into contact with the NFC tag, the ATM transmits a deposit/withdrawal application running command to the mobile terminal, and the mobile terminal receives the command and then runs the application to transmit the transaction information to the ATM or the server.

An automated teller machine service method according to another aspect of the present disclosure includes bringing a mobile terminal including a near-field communication (NFC) chip into contact with an automated teller machine (ATM) including an NFC tag by a user, transmitting a deposit/withdrawal application running command to the mobile terminal by the ATM, receiving the running command, running the deposit/withdrawal application, and displaying the deposit/withdrawal application on a screen by the mobile terminal, transmitting transaction information from the mobile terminal to a server in which financial information is saved upon running the application, and receiving the transaction information and, in a case in which the transaction information matches the previously-saved financial information as a result of comparing the two pieces of information, transmitting deposit/withdrawal authorization information to the ATM by the server.

Advantageous Effects

According to the present disclosure, there is convenience of being able to use an automated teller machine (ATM) without a bankbook or a cash card, and since information related to a deposit or withdrawal is processed using an input/output function of a mobile terminal, the risk of exposing a password due to touching a screen of an ATM or inputting using buttons of the ATM can be reduced, thereby enhancing security.

BEST MODE OF THE INVENTION

Advantages and features of the present disclosure and a method of achieving the same should become clear with embodiments described in detail below with reference to the accompanying drawings. However, the present disclosure is not limited to embodiments disclosed below and is realized in various other forms. The present embodiments make the disclosure of the present invention complete and are provided to completely inform one of ordinary skill in the art to which the present disclosure pertains of the scope of the disclosure. The present disclosure is defined only by the scope of the claims. Terms used herein are for describing the embodiments and are not intended to limit the present disclosure. In the specification, a singular expression includes a plural expression unless the context clearly indicates otherwise. "Comprises" and/or "comprising" used herein do not preclude the existence or the possibility of adding one or more elements, steps, operations and/or devices other than those mentioned.

Hereinafter, exemplary embodiments of the present disclosure will be described in detail below with reference to the accompanying drawings.

Figure 1:
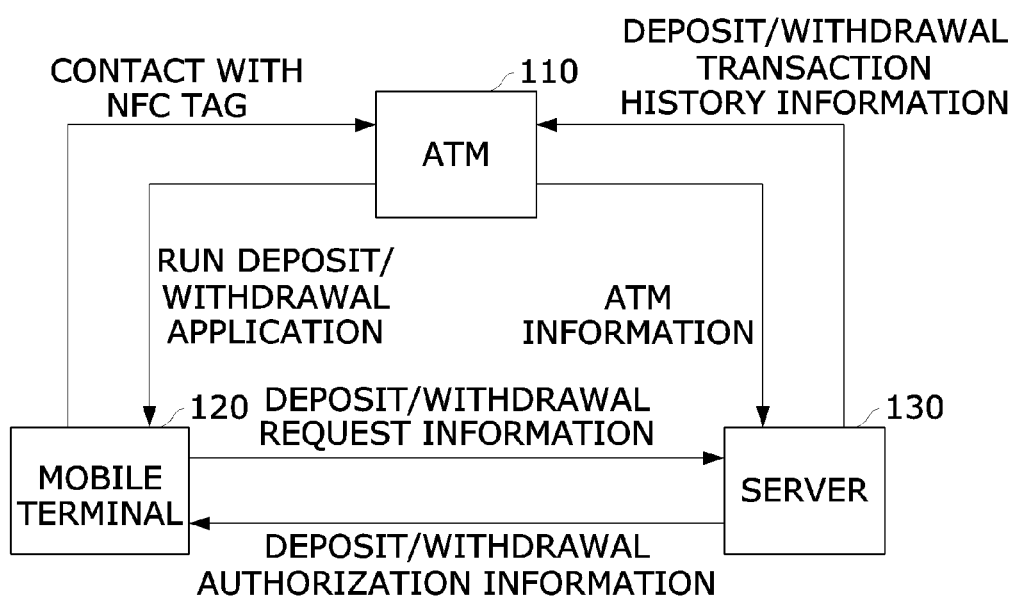
FIG. 1 is a structural diagram of an automated teller machine service system according to one embodiment of the present disclosure.

FIG. 1 illustrates a configuration of an automated teller machine service system according to an embodiment of the present disclosure.

The automated teller machine service system is configured of an automated teller machine (ATM) 110, a mobile terminal 120, and a server 130.

Since the ATM 110 includes a near-field communication (NFC) tag, the ATM 110 may recognize the mobile terminal 120 such as a smartphone having an NFC function. Further, when pieces of information required for a deposit/withdrawal transaction are exchanged between the ATM 110 and the server 130 through communication with the server 130, and the ATM 110 receives an authorization number from the server 130, the ATM 110 directly performs a withdrawal or deposit. In this case, the ATM 110 may also dispense a prepaid card, a gift certificate, a gift card, a lottery ticket, and the like corresponding to a certain amount of money instead of cash.

As still another configuration of the ATM 110, in a case in which the ATM 110 does not include a communication module, the ATM 110 can only communicate with the mobile terminal 120 through an NFC method and cannot communicate with the server 130.

Therefore, in such a case, the exchange of pieces of information required for a deposit/withdrawal transaction is only performed between the mobile terminal 120 and the server 130, and the ATM 110 receives authorization information from the mobile terminal 120 by the NFC method, verifies the authorization information through a security authorization authentication module built therein, and then performs a deposit or withdrawal.

When the mobile terminal 120 including an NFC chip is brought into contact with the NFC tag of the ATM 110, the ATM 110 transmits a command to run an application (app) of the mobile terminal 120 using a push method.

Although the application should be pre-installed for service use, the application may also be installed after the command is received using the push method.

When a name of a financial institution for a deposit/withdrawal service, account information such as an account number, member information for use of automated teller machine service, and the like are set during initial run of the application, the application may be conveniently re-used using saved information without inputting the above pieces of information.

When the mobile terminal 120 that has received the command runs the application and displays the application on a screen, since pieces of information related to a deposit or withdrawal are displayed through the application, and a password or the like is input using a touch interface or an input device of the mobile terminal 120, the ATM 110 may provide a deposit/withdrawal service without a display device or an input device.

The mobile terminal 120 may be a device such as a smartphone including an NFC chip and having a screen display device and an input means for a deposit/withdrawal transaction. However, the mobile terminal 120 is not limited thereto.

The mobile terminal 120 transmits and receives pieces of information required for a transaction to and from the ATM 110 and the server 130. The mobile terminal 120 exchanges pieces of information for preventing forgery and falsification such as a location, a unique number, and a phone number of the mobile terminal 120, and a machine number and a location of the ATM 110, and pieces of information related to a deposit or withdrawal such as a name of a financial institution for a deposit or withdrawal, a unique code of the financial institution, an amount for deposit or withdrawal, and a password with the ATM 110 and the server 130.

In a case in which a screen of the mobile terminal 120 is configured of a touchscreen, a financial institution for transaction, an account number, a transaction amount, a password input window, and the like may be displayed on the screen, and a user may input deposit/withdrawal information by touching each of the above.

A variable key pad may be applied to the password input window, and an additional authentication means such as fingerprint recognition, signature recognition, and facial recognition, iris recognition, or the like using a camera may also be applied thereto for further enhancing security.

In addition, in a case in which a pulse rate sensor and a humidity sensor of the mobile terminal are used, an increase of a pulse rate or a discharge of sweat due to improper use may be measured as with a lie detector, and on the basis of the measurement, a withdrawal following a theft or threat may be sensed, and the withdrawal may be blocked.

When an authorization result is received after pieces of deposit/withdrawal information are transferred to the server 130, the NFC chip of the mobile terminal 120 is brought into contact with the NFC tag of the ATM 110 once more to check a transaction and process a deposit or withdrawal through the ATM 110.

The server 130 saves member information of a service user, account information of a financial institution, and the like therein and uses the pieces of information to determine whether pieces of information received from the mobile terminal 120 or the ATM 110 are true or false.

When the pieces of received information are determined to be true, a transaction is authorized, and an authorization number is transmitted to the mobile terminal 120 and the ATM 110 for a deposit or withdrawal to be performed.

Figure 2:
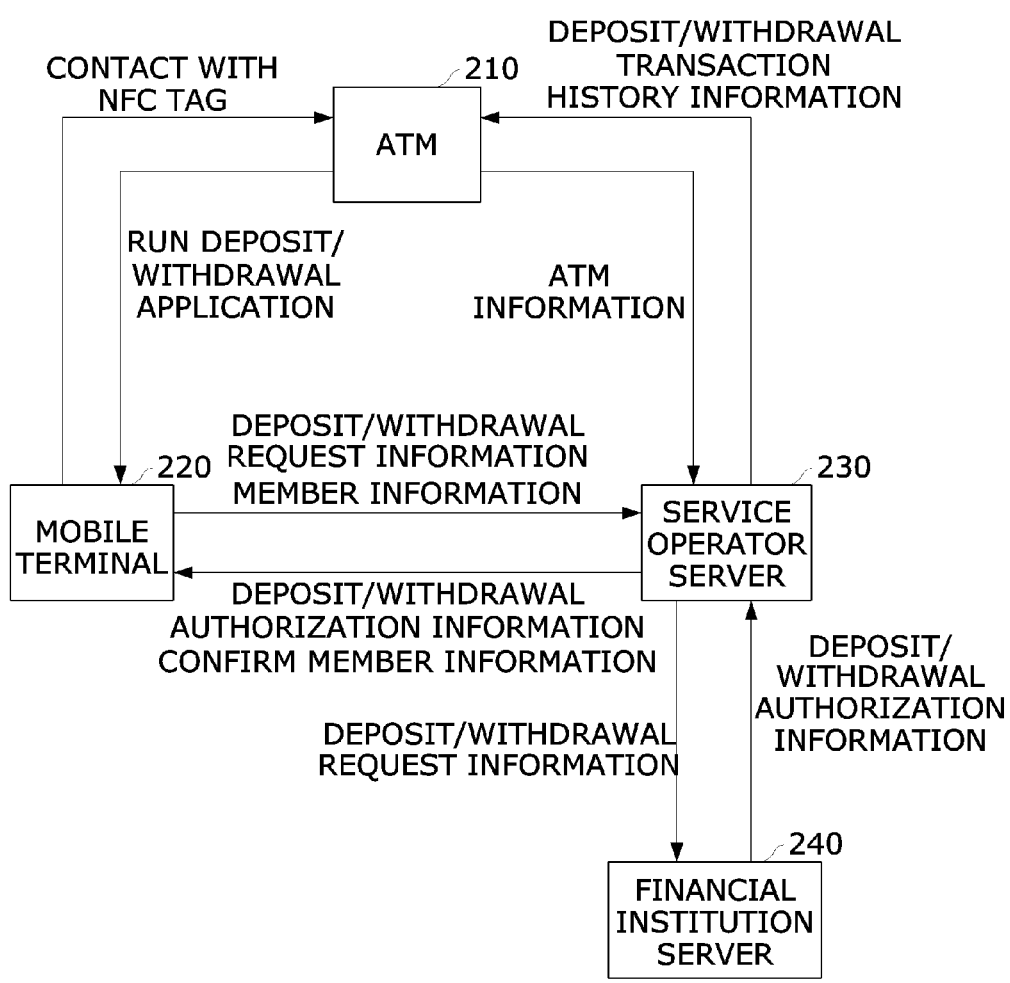
FIG. 2 is a structural diagram of an automated teller machine service system according to another embodiment of the present disclosure.

FIG. 2 illustrates a configuration of an automated teller machine service system according to another embodiment of the present disclosure. The automated teller machine service system includes a service operator server 230 and a financial institution server 240 for an automatic teller service.

The service operator server 230 saves machine information of an ATM 210, information of members who joined the automated teller machine service, information of an authenticated mobile terminal 220, and the like and compares the pieces of information to determine whether a transaction is normal.

The financial institution server 240 only saves pieces of information related to a deposit or withdrawal such as a name of a financial institution, an account number, an amount for deposit or withdrawal, and a password and performs comparison and determination to authorize a deposit or withdrawal.

A configuration of an ATM may be simplified through the above system configuration, loss due to theft or voice phishing may be prevented since pieces of information for a transaction are displayed on a mobile terminal such as a user's smartphone and input through the mobile terminal, and a cash deposit/withdrawal service may be conveniently used without carrying a cash card, a bankbook, or the like.

Hereinafter, methods of providing an automated teller machine service using the above-described systems will be described in detail.

Figure 3:
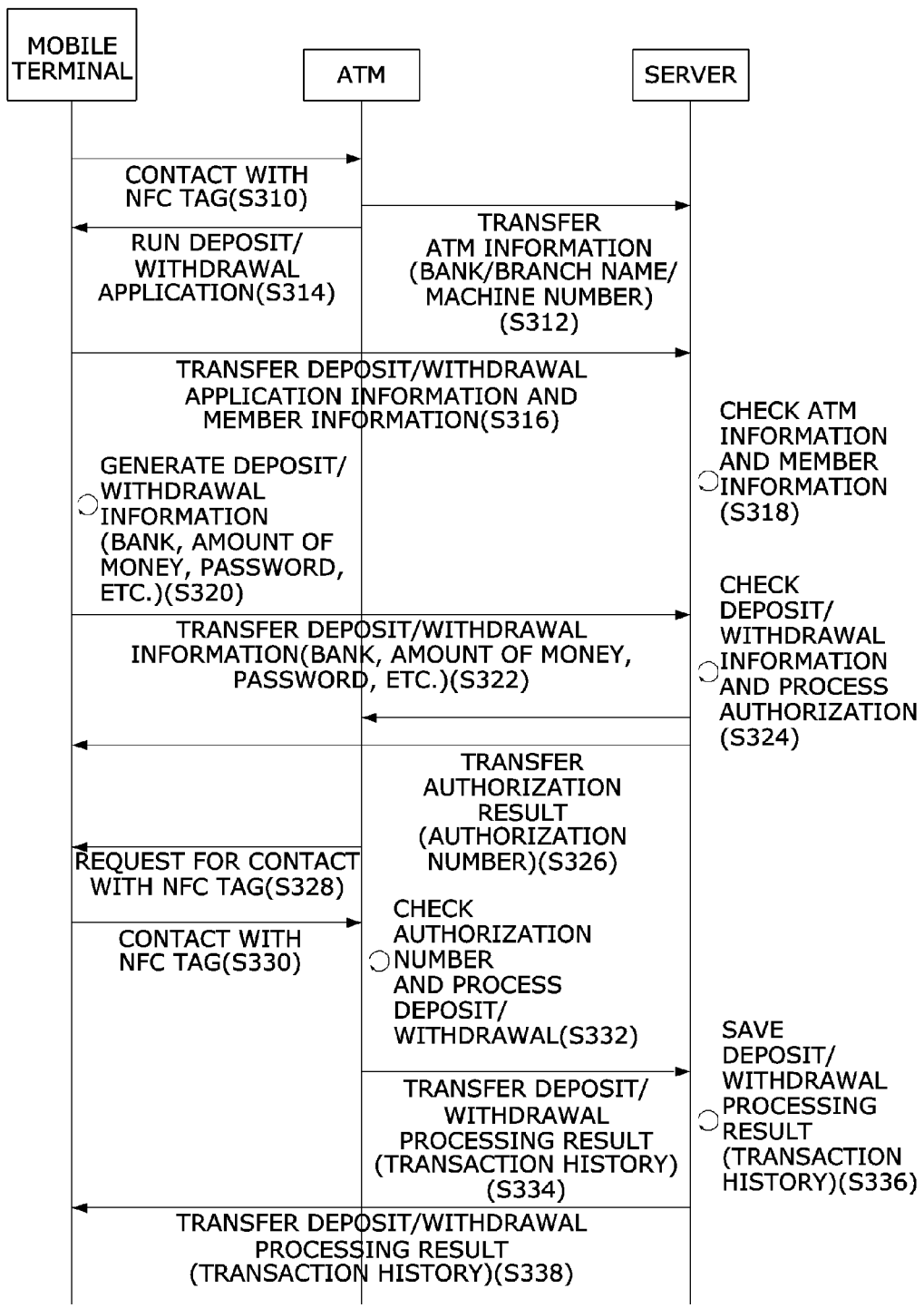
FIG. 3 is a flowchart of an automated teller machine service method according to still another embodiment of the present disclosure.

FIG. 3 illustrates a flowchart of an automated teller machine service using an NFC function according to still another embodiment of the present disclosure.

Figure 5A:
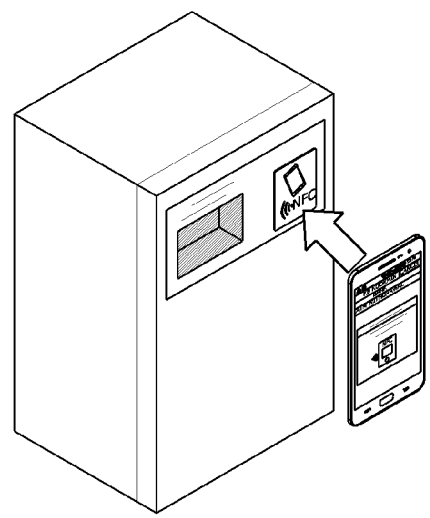
FIG. 5A through FIG. 5C are views illustrating a state of contact between an automated teller machine (ATM) and a mobile terminal, and a screen display state of the mobile terminal in accordance with a service step of the ATM and the mobile terminal according to the present disclosure.

For service use, a user brings a mobile terminal having an NFC chip built therein into contact with an NFC tag of an ATM (S310) as shown in FIG. 5A, and the ATM that has recognized the mobile terminal transfers pieces of information such as a name of a financial institution, a branch name, a unique number, and a location of the ATM to a server for the pieces of information to be used as information for authenticating a transaction afterwards (S312).

Then, the ATM transmits an application running command to the mobile terminal using a push method for a deposit/withdrawal application to be run in the mobile terminal (S314).

The mobile terminal receives the application running command, runs the application, and transfers information unique to the application for checking falsification such as hacking of the deposit/withdrawal application, member information for use of a cash deposit/withdrawal service, and a device number, a phone number, a location information, and the like of the mobile terminal to the server (S316).

The server compares the pieces of information received from the ATM and the mobile terminal and determines whether the transaction is normal (S318). For example, a location of an ATM may be checked using a unique number or the like of the ATM, the checked location may be compared with location information received from a mobile terminal, and a transaction may be authorized only when the ATM and the mobile terminal are placed within a certain predetermined distance.

Figure 5B:
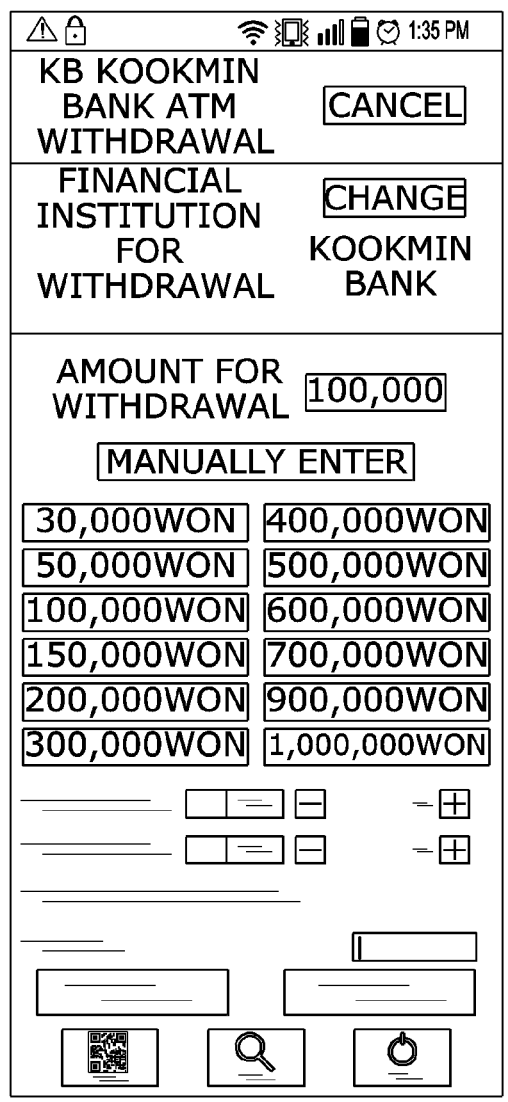

As shown in FIG. 5B, a name of a bank for a deposit or withdrawal, an amount for withdrawal, a password input blank, and the like are shown on a screen of the mobile terminal in which the application is run. For security, an account number, accredited certificate information, and the like may be input only once during initial run of the application and may be set so as not to appear on a deposit/withdrawal screen.

The user selects an amount for a deposit or withdrawal and inputs a password through the run application (S320). For security, a variable key pad may be used as a key pad for inputting the password. To enhance security, an additional authentication method such as a signature or fingerprint input using a touchpad, and facial recognition, iris recognition, or the like using a camera of the mobile terminal may be used in addition to inputting the password.

In a case in which the user is threatened by a robber, since cash or the like may be stolen when the user inputs a correct password, and the user may face physical risks such as assault by the robber when continuously inputting an incorrect password, the user may preset a second password to prepare for such dangerous situations.

When the user inputs a second password in a dangerous situation, a financial institution, a police station, or the like may be automatically reached while it seems that a withdrawal is being normally proceeded by the mobile terminal or the ATM, and actions such as dispatch to arrest a criminal or recording surroundings of the ATM using a closed circuit television (CCTV) camera may be taken.

In a dangerous situation, fake cash, a fake gift certificate, or a fake prepaid card may be dispensed from the ATM instead of real cash, a real gift certificate, or a real prepaid card, and a global positioning system (GPS) chip or the like capable of tracking a robber or an improper user may be installed in such fake cash.

When the inputting via the mobile terminal is completed, the mobile terminal transmits the pieces of deposit/withdrawal information such as a bank name, an amount of money, and a password to the server (S322).

The server receives the transmitted pieces of deposit/withdrawal information, compares the received pieces of deposit/withdrawal information with an account number and a password which have been previously saved, and compares the signature, the fingerprint, the face, the iris, or the like, which is an additional authentication means, with previously-saved information to determine whether to authorize the transaction (S324).

When the transaction is authorized, the server transmits an authorization number, which is an authorization result, to each of the ATM and the mobile terminal (S326).

Figure 5C:
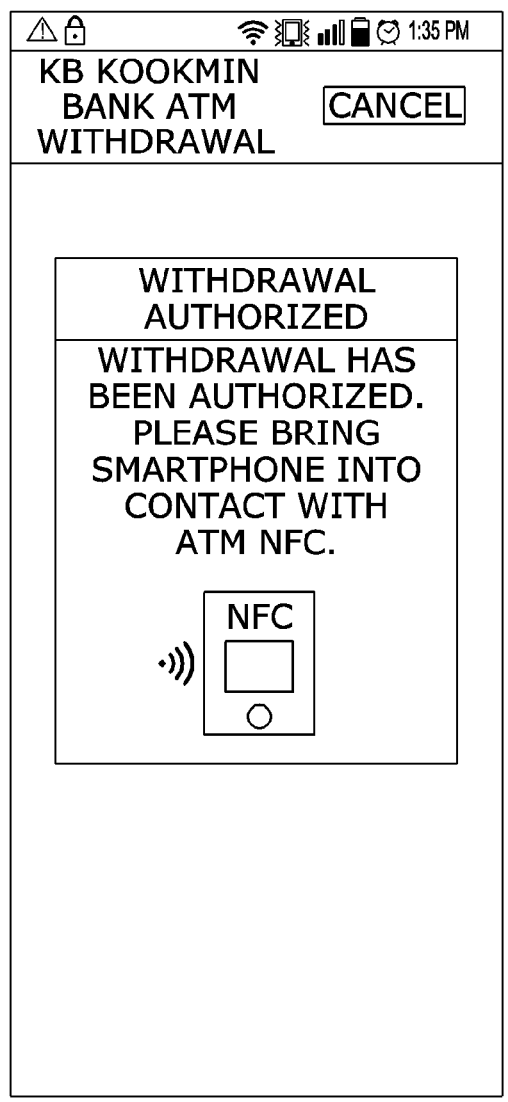

The ATM that has received the authorization number requests for contact between the NFC chip of the mobile terminal and the NFC tag once more for security (S328), and a request screen is displayed on the screen of the mobile terminal as shown in FIG. 5C.

When the user brings the mobile terminal into contact with the NFC tag of the ATM (S330), the authorization number is transferred to the ATM. The ATM compares the authorization number with the authorization number received from the server and performs deposit or withdrawal of cash when the two authorization numbers match (S332). In this case, as described above, a gift certificate, a prepaid card, a lottery ticket, or the like may also be dispensed instead of cash.

When the deposit or withdrawal is completed, the ATM saves a transaction history and transmits the transaction history to the server (S334). The server saves and records the received transaction history like a general bank transaction (S336).

When saving of the transaction history is completed, at last, the server transfers the transaction history to the mobile terminal (S338), and the user confirms through the screen of the mobile terminal that the transaction has been normally ended.

Figure 4:
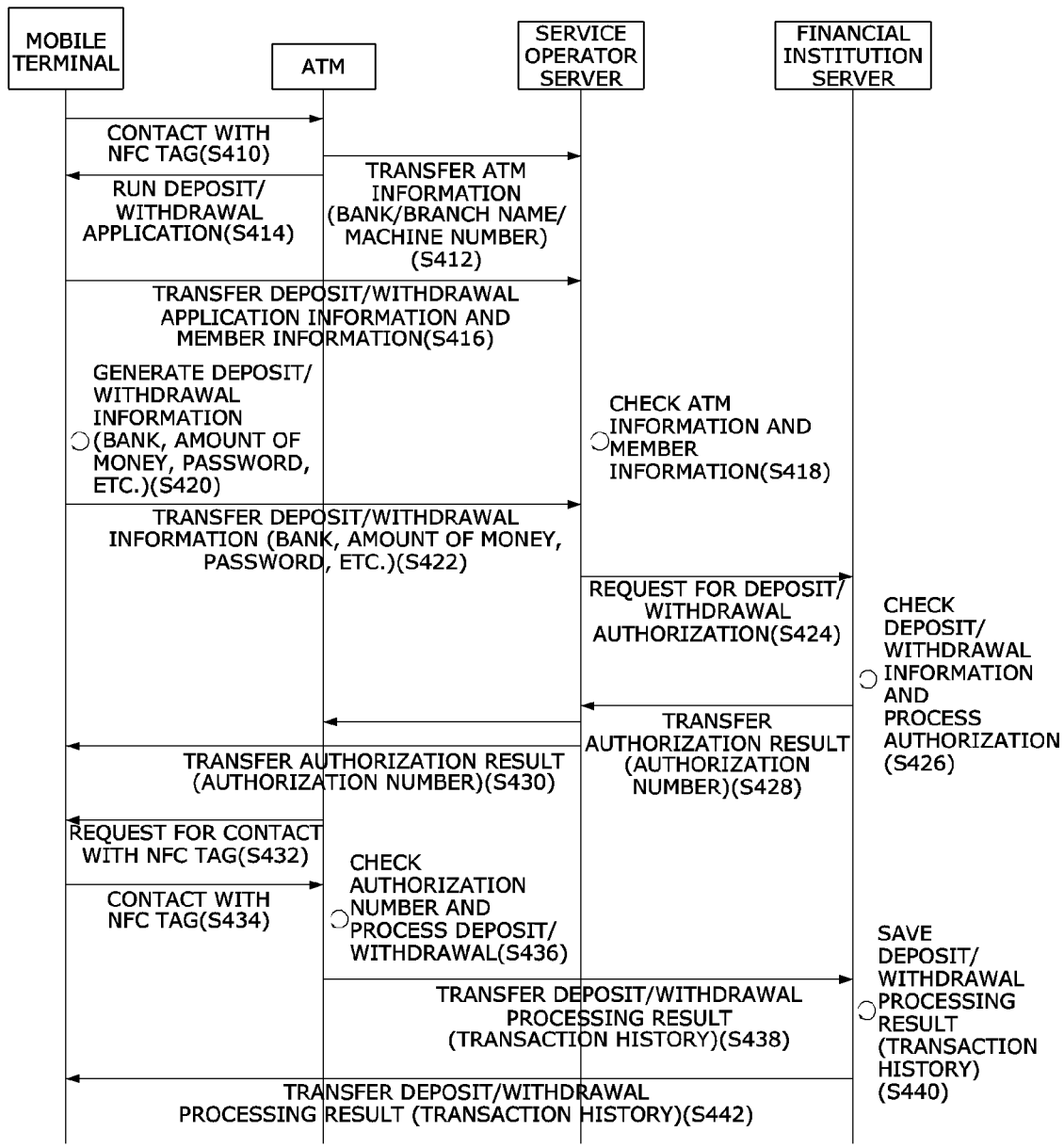
FIG. 4 is a flowchart of an automated teller machine service method according to yet another embodiment of the present disclosure.

FIG. 4 illustrates an automated teller machine service method using an NFC function according to yet another embodiment of the present disclosure. In this case, a server is formed of a service operator server and a financial institution server.

When an NFC chip of a mobile terminal is brought into contact with an NFC tag of an ATM (S410), the ATM transfers pieces of information about itself to the service operator server (S412) and transmits a command for running a deposit/withdrawal application to the mobile terminal (S414).

The mobile terminal receives the command and then transmits deposit/withdrawal application information and member information to the service operator server (S416). The service operator server checks the member information or the like from the pieces of information received from the mobile terminal and the pieces of information received from the ATM (S418).

The mobile terminal that has run the application receives pieces of deposit/withdrawal information such as an amount of money and a password from the user (S420) and transmits the received pieces of information to the service operator server (S422). Then, the service operator server transmits the received pieces of information to the financial institution server and requests for authorization of a deposit or withdrawal (S424).

The financial institution server checks the received pieces of deposit/withdrawal information and authorizes a transaction (S426), and transmits an authorization number to the service operator server (S428). Then, the service operator server transmits the authorization number to each of the ATM and the user's mobile terminal (S430).

The ATM that has received the authorization number requests for contact of the NFC chip of the mobile terminal again (S432), and when the NFC chip of the mobile terminal is brought into contact (S434), the ATM receives the authorization number therefrom, checks the authorization number, and processes a deposit or withdrawal (S436).

When the processing of a deposit or withdrawal is completed, the ATM transfers a transaction history to the financial institution server (S438), and the financial institution server saves the received transaction history (S440) and then transfers the received transaction history to the mobile terminal. Then, the user may confirm the transaction history through the mobile terminal.

Figure 6:
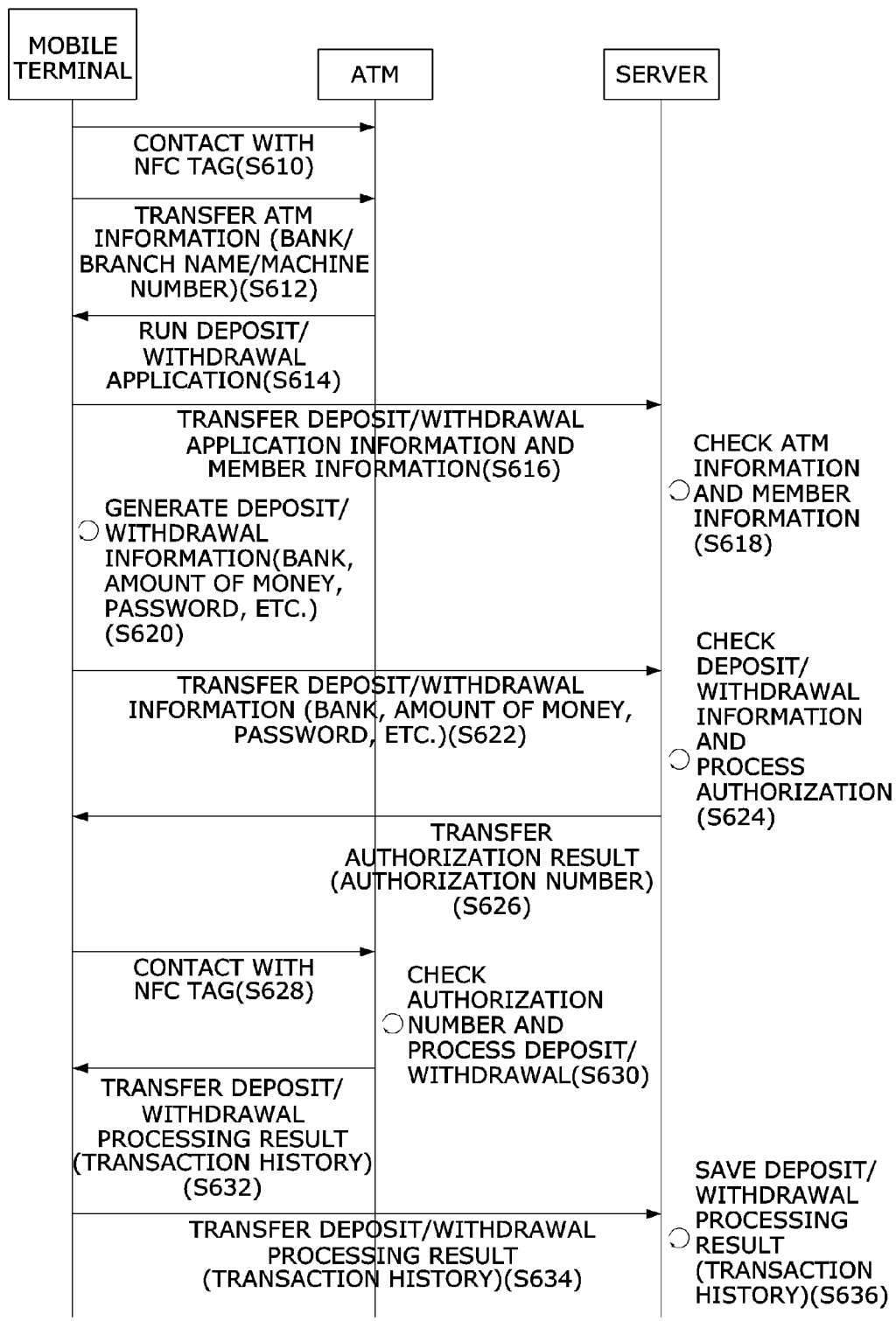
FIG. 6 is a flowchart of an automated teller machine service method in a case in which an ATM does not include a communication module except for near-field communication (NFC) according to yet another embodiment of the present disclosure.

FIG. 6 illustrates a flowchart of an automated teller machine service method of a case in which an ATM does not include a communication module except for NFC according to yet another embodiment of the present disclosure.

Since the ATM does not include a separate communication module, pieces of information related to payment and authorization may be transmitted and received only through communication with a user's mobile terminal, and the mobile terminal is in charge of communication with a server.

When the user brings the mobile terminal into contact with the ATM (S610), the ATM transfers pieces of information about itself to the mobile terminal (S612), and simultaneously, transfers an application running command to the mobile terminal using a push method for a deposit/withdrawal application to be run in the mobile terminal (S614).

The mobile terminal transfers the received pieces of ATM information to the server along with pieces of information of the deposit/withdrawal application (S616). The server receives the pieces of information and checks whether the deposit/withdrawal application is forged, the pieces of ATM information, and pieces of member information (S618).

The mobile terminal that has run the deposit/withdrawal application receives pieces of information such as a bank from which cash is withdrawn, an amount for withdrawal, and a password from the user and generates deposit/withdrawal information (S620), and transmits the generated deposit/withdrawal information to the server (S622).

The server checks the received deposit/withdrawal information and authorizes a transaction when the transaction is normal (S624), and transfers an authorization result to the mobile terminal along with an authorization number (S626).

When the mobile terminal receives the authorization number, the user brings the mobile terminal into contact with the ATM again and transfers the authorization number and the deposit/withdrawal information to the ATM (S628). Then, the ATM uses a security authorization authentication module built therein to check the authorization number and perform a deposit or withdrawal (S630).

A result of performing the deposit or withdrawal is transferred to the mobile terminal again (S632), and the mobile terminal transfers the result of performing the deposit or withdrawal to the server in place of the ATM that does not include a communication module (S634). Then, the server receives the result of performing the deposit or withdrawal and saves a transaction history (S636), and the transaction is ended.

Through the above automated teller machine service system and method thereof, a user can use a teller service that is convenient and has enhanced security, and a financial accident can be prevented.

Although a configuration of the present disclosure has been described in detail above with reference to the accompanying drawings, this is merely illustrative, and various modifications and changes may be made by those of ordinary skill in the art to which the present disclosure pertains within the scope of the technical spirit of the present disclosure. Therefore, the scope of the present disclosure should not be limited to the above-described embodiments and should be defined by the claims below.

The invention claimed is:

1. An automated teller machine service system comprising:
    an automated teller machine (ATM) including a near-field communication (NFC) tag;
    a mobile terminal including a NFC chip and configured to process a deposit or withdrawal; and
    a server configured to receive transaction information for processing the deposit or withdrawal from the mobile terminal, and in response to the transaction information matching previously-saved information, transmit deposit/withdrawal authorization information to the ATM, wherein:
    in response to the NFC chip of the mobile terminal being brought into contact with the NFC tag of the ATM, the ATM transmits a deposit/withdrawal application running command from the ATM to the mobile terminal to launch a deposit/withdrawal application of the mobile terminal according to the deposit/withdrawal application running command; and
    in response to the deposit/withdrawal application being executed according to the deposit/withdrawal application running command, the mobile terminal transmits the transaction information to the ATM or the server.

2. The automated teller machine service system of claim 1, wherein:
    the server includes a service operator server and a financial institution server;
    the service operator server saves information of members of the automated teller machine service; and
    the financial institution server stores account information for processing the deposit or withdrawal.

3. The automated teller machine service system of claim 1, wherein the server receives each of location information of the ATM and location information of the mobile terminal, compares the location information of the ATM with the location information of the mobile terminal, and authorizes a deposit/withdrawal transaction only when the ATM and the mobile terminal are placed within a predetermined distance.

4. The automated teller machine service system of claim 1, wherein the transaction information includes a code of a financial institution for a transaction, a transaction amount, a password, a unique number of the ATM, deposit/withdrawal authorization information, and user information.

5. The automated teller machine service system of claim 1, wherein the mobile terminal runs the deposit/withdrawal application, displays the application and a password input window on a screen of the mobile terminal, and receives the transaction information for processing the deposit or withdrawal from a user, and
wherein the password input window comprises a variable key pad.

6. The automated teller machine service system of claim 5, wherein the screen further includes an input window, which is separate from the password input window, for recognizing one or more from among a fingerprint, a signature, an iris, and a face of the user.

7. The automated teller machine service system of claim 1, wherein the ATM receives the deposit/withdrawal authorization information and then dispenses cash, a gift certificate, a prepaid card, a ticket, or a lottery ticket corresponding to an authorized amount of money.

8. An automated teller machine service method comprising:
bringing a mobile terminal including a near-field communication (NFC) chip into contact with an automated teller machine (ATM) including an NFC tag by a user;
transmitting a deposit/withdrawal application running command to the mobile terminal by the ATM;
receiving the running command, running the deposit/withdrawal application, and displaying the deposit/withdrawal application on a screen by the mobile terminal;
transmitting transaction information from the mobile terminal to a server in which financial information is saved upon running the application; and
receiving the transaction information and, in a case in which the transaction information matches the previously-saved financial information as a result of comparing the two pieces of information, transmitting deposit/withdrawal authorization information to the ATM by the server.

9. The automated teller machine service method of claim 8, further comprising, after the displaying, transmitting location information of the ATM to the server, wherein:
the transaction information includes location information of the mobile terminal; and
the server compares the location information of the ATM with the location information of the mobile terminal and transmits the authorization information only when the ATM and the mobile terminal are placed within a predetermined distance.

10. The automated teller machine service method of claim 8, wherein the transaction information includes a code of a financial institution for a transaction, a transaction amount, a password, a unique number of the ATM, deposit/withdrawal authorization information, and user information.

11. The automated teller machine service method of claim 8, wherein the displayed screen includes a password input window configured of a variable key pad.

12. The automated teller machine service method of claim 11, wherein the displayed screen further includes an input window, which is separate from the password input window, for recognizing one or more from among a fingerprint, a signature, and a face of a user.

13. The automated teller machine service method of claim 8, further comprising, after the transmitting of the deposit/withdrawal authorization information, receiving the authorization information and then dispensing cash, a gift certificate, a prepaid card, a ticket, or a lottery ticket corresponding to an authorized amount of money, by the ATM.

14. The automated teller machine service method of claim 8, further comprising, after the displaying on the screen, inputting deposit/withdrawal information through the displayed screen by the user.

15. An automated teller machine service method comprising:
bringing a mobile terminal including a near-field communication (NFC) chip into contact with an automatic teller machine (ATM) including an NFC tag;
transmitting a deposit/withdrawal application running command to the mobile terminal by the ATM;
receiving the deposit/withdrawal application running command from the ATM, running the deposit/withdrawal application, and displaying the deposit/withdrawal application on a screen of the mobile terminal by the mobile terminal;
transmitting transaction information saved in the mobile terminal from the mobile terminal to a service operator server in which information of members of an automated teller machine service is saved;
receiving the transaction information and then transmitting the transaction information to a financial transaction server in which financial information is saved, by the service operator server; and
receiving the transaction information and then, when the transaction information matches the previously-saved financial information as a result of comparing the two pieces of information, transmitting deposit/withdrawal authorization information from the financial transaction server to the service operator server or the ATM, by the financial transaction server.

16. An automated teller machine service method comprising:
bringing a mobile terminal including a near-field communication (NFC) chip into contact with an automatic teller machine (ATM) including an NFC tag;
transmitting a deposit/withdrawal application running command to the mobile terminal by the ATM;
receiving the running command, running the deposit/withdrawal application, and displaying the deposit/withdrawal application on a screen by the mobile terminal;
transmitting transaction information saved in the mobile terminal from the mobile terminal to a server in which financial information is saved;
receiving the transaction information and then, when the transaction information matches the previously-saved financial information as a result of comparing the two pieces of information, transmitting deposit/withdrawal authorization information to the mobile terminal by the server;
bringing the mobile terminal into contact with the NFC tag of the ATM and transferring the deposit/withdrawal authorization information to the ATM by the user; and
verifying the deposit/withdrawal authorization information and then performing a deposit or withdrawal by the ATM.

17. The automated teller machine service system of claim 1, wherein:
    when the ATM receives the deposit/withdrawal authorization information from the server and the NFC chip of the mobile terminal is brought into contact with the NFC tag of the ATM again, the ATM compares the transaction information with the previously-saved information, and performs the deposit or withdrawal in response to the transaction information matching previously-saved information.

18. The automated teller machine service system of claim 1, wherein:
    the ATM performs the withdrawal or deposit in response to receiving the transaction information from the mobile terminal and receiving an authorization number from the server.

19. The automated teller machine service system of claim 1, wherein:
    the ATM performs the withdrawal by dispensing a prepaid card, a gift certificate, or a gift card having an amount that corresponds to an withdrawal amount indicated in the deposit/withdrawal authorization information, instead of dispensing cash corresponding to the withdrawal amount.

* * * * *